(12) United States Patent
Boesnecker

(10) Patent No.: US 11,323,820 B2
(45) Date of Patent: May 3, 2022

(54) LOUDSPEAKER WITH A ROLLABLE MEMBRANE

(71) Applicant: AIFC-U Unternehmensförderung, Potsdam (DE)

(72) Inventor: Robert Boesnecker, Ergolding (DE)

(73) Assignee: AIFC-U Unternehmensförderung, Potsdam (DE)

( * ) Notice: Subject to any disclaimer, the term of this patent is extended or adjusted under 35 U.S.C. 154(b) by 0 days.

(21) Appl. No.: 16/603,125

(22) PCT Filed: Apr. 5, 2018

(86) PCT No.: PCT/EP2018/058781
§ 371 (c)(1),
(2) Date: Oct. 4, 2019

(87) PCT Pub. No.: WO2018/189034
PCT Pub. Date: Oct. 18, 2018

(65) Prior Publication Data
US 2020/0112796 A1 Apr. 9, 2020

(30) Foreign Application Priority Data
Apr. 12, 2017 (DE) ...................... 10 2017 107 958.0

(51) Int. Cl.
*H04R 7/02* (2006.01)
*H04R 9/06* (2006.01)
(Continued)

(52) U.S. Cl.
CPC ............. *H04R 9/06* (2013.01); *H04N 9/3141* (2013.01); *H04R 7/04* (2013.01); *H04R 7/16* (2013.01);
(Continued)

(58) Field of Classification Search
CPC . H04R 7/04; H04R 7/045; H04R 7/06; H04R 2307/027; H04R 2440/05
See application file for complete search history.

(56) References Cited

U.S. PATENT DOCUMENTS 2,855,467 A 10/1958 Curry
3,345,469 A 10/1967 Rod
(Continued)

FOREIGN PATENT DOCUMENTS

CN 1427650 A 7/2003
CN 105228757 A 1/2016
(Continued)

OTHER PUBLICATIONS

PCT; App No. PCT/EP2018/058781; International Search Report and Written Opinion dated Jun. 13, 2018.
(Continued)

*Primary Examiner* — Ryan Robinson
(74) *Attorney, Agent, or Firm* — Fitch, Even, Tabin & Flannery, LLP

(57) ABSTRACT

The invention relates to a mobile loudspeaker apparatus for playing back sound. Mobile loudspeaker systems are often disadvantageous in that they have a poor sound quality or require equipment for a good sound quality that is not easy to transport. A loudspeaker apparatus which firstly provides a good sound quality and secondly is also easily transportable is desirable. Previously, these two requirements were often mutually exclusive. By way of a bistable membrane, or a membrane that is stable in more than two states, said membrane being coupleable to the loudspeaker apparatus, it is possible to manage the balancing act between good transportability and a good sound quality of the loudspeaker apparatus. The bistable membrane can be changed from a stable operating state into a stable transport state. By way of a slight pressure at both ends of the bistable membrane, the
(Continued)

latter can be rolled up and consequently changed into the transport state. By way of example, in the transport state, the bistable membrane can engage around a cylindrical housing that partly or wholly encloses the loudspeaker apparatus.

13 Claims, 8 Drawing Sheets

(51) Int. Cl.
*H04N 9/31* (2006.01)
*H04R 7/04* (2006.01)
*H04R 7/16* (2006.01)
*H04R 31/00* (2006.01)
*G03B 21/56* (2006.01)

(52) U.S. Cl.
CPC .......... *H04R 31/003* (2013.01); *G03B 21/56* (2013.01); *H04R 2307/027* (2013.01)

(56) References Cited

U.S. PATENT DOCUMENTS

| | | | |
|---|---|---|---|
| 4,429,190 A | 1/1984 | Stockbridge | |
| 4,856,071 A | 8/1989 | Marquiss | |
| 6,044,159 A | 3/2000 | Schmertmann et al. | |
| 9,625,948 B2* | 4/2017 | Zhang | G06F 1/1615 |
| 9,751,275 B2* | 9/2017 | van der Veld | B65D 85/671 |
| 10,602,623 B1* | 3/2020 | Myers | G06F 3/147 |
| 2004/0156523 A1 | 8/2004 | Tuason | |
| 2005/0105748 A1* | 5/2005 | Bartell | H04R 7/04 381/306 |
| 2008/0069387 A1 | 3/2008 | Cheung et al. | |
| 2009/0060249 A1* | 3/2009 | Liou | H04R 7/06 381/386 |
| 2013/0044215 A1 | 2/2013 | Rothkopf et al. | |
| 2017/0344073 A1* | 11/2017 | Kang | G06F 1/1652 |
| 2020/0100371 A1* | 3/2020 | Choi | H05K 5/0017 |

FOREIGN PATENT DOCUMENTS

| | | | | |
|---|---|---|---|---|
| DE | 69011890 T2 | 2/1995 | | |
| DE | 102004007020 A1 | 9/2005 | | |
| DE | 69635485 T2 | 8/2006 | | |
| DE | 102008047796 A1 | 4/2010 | | |
| EP | 0865713 B1 | 9/1998 | | |
| GB | 1429631 A | 3/1976 | | |
| JP | 2004312643 A | 11/2004 | | |
| JP | 2009302924 A | 12/2009 | | |
| JP | 2014175976 A | 9/2014 | | |
| JP | 2015109578 A | 6/2015 | | |
| WO | 1997009853 A2 | 3/1997 | | |
| WO | 2003061338 A1 | 7/2003 | | |
| WO | WO-2008019747 A1 * | 2/2008 | ............. | H04R 17/00 |
| WO | 2010031612 A1 | 3/2010 | | |
| WO | WO-2010031612 A1 * | 3/2010 | .............. | H04R 7/04 |
| WO | 2013127096 A1 | 9/2013 | | |
| WO | 2014143723 A2 | 9/2014 | | |

OTHER PUBLICATIONS

CNIPA, App. No. 201880024665.2; Chinese search report, dated Sep. 21, 2020, and First Examination Report, dated Sep. 27, 2020; pp. 1-11 (English translation of Chinese search report).
Wikipedia; "Bistability"; https://en.wikipedia.org/wiki/Bistability; Retrieved on Dec. 1, 2020; pp. 1-7.
IP Australia; App. No. 2018251100; Examination report No. 1 for standard patent application dated Jan. 29, 2021.
CNIPO; App. No. 201880024665.2; Second Examination Report dated Apr. 20, 2021.

* cited by examiner

LOUDSPEAKER WITH A ROLLABLE MEMBRANE

CROSS-REFERENCE TO RELATED APPLICATIONS

This application is a U.S. national phase application of International Application No. PCT/EP2018/058781, filed Apr. 5, 2018, designating the United States, which claims priority to German Patent Application No. 10 2017 107 958.0, filed Apr. 12, 2017.

FIELD

The present invention relates to a loudspeaker apparatus for generating sound with an electromechanical transducer for converting electrical signals into mechanical oscillations and a membrane, which is coupled to the electromechanical transducer. This loudspeaker apparatus aims to play back acoustic events, for example voice, music, film, sounds and the like. In addition, this loudspeaker apparatus is particularly conceived for the mobile employment.

BACKGROUND

The printed matter DE 10 2008 047 796 A1 describes a device for playing back sound. The playback of sound is achieved by means of at least one foil, which is partially excitable to transversal oscillations. Therein, a material is understood by the term foil, which is bendable and/or windable and/or rollable and which at least partially permanently maintains this property. In order to ensure sufficient stability in use, it is for example proposed that the foil is supported with the aid of a frame-like construction. However, the foil thereby partially loses its flexibility.

From the patent specification U.S. Pat. No. 4,856,071 of Marquis, a drive for loudspeakers is known, which is not based on a round driving coil, but on a rectangular driving coil. This drive uses elongated, rectangular magnets and coils, while conventional loudspeakers employ round magnet drives and coils. The advantage of this patent is in that the driving coil does no longer have to be wound round, but can be printed onto a printed circuit board. Despite of this advantage, this type of loudspeaker has hardly gained acceptance on the market heretofore. Obviously, this advantage is not sufficient to establish on the market.

Furthermore, document WO 2013/127096 A1 reveals a loudspeaker device with a folded membrane. The membrane is flat before mounting. For operation, the membrane is fixed in a cup-like shape.

A concept for a mobile loudspeaker is known from the company ellula. This company offers an inflatable loudspeaker, the so-called "Hot Air" loudspeaker. A disadvantage of this construction is the inflatable volume. It takes certain time until the user has inflated the loudspeaker. Discharging or pressing out the air also requires a not insignificant expenditure of force and time. Obviously, the advantages of this loudspeaker system are not convincing since this loudspeaker system either could not gain acceptance on the market heretofore.

Due to the today's smart phone technology, nowadays, it is easily possible to listen to music outside of residential buildings, for example in parkways or forests. It is only required to have stored the music as a file on the smart phone or to obtain music from the Internet via a mobile data link. Since smart phones are constructed transportable, there is little installation space available for a loudspeaker. As a result, no well sounding music subjectively arises for most of the users. For this reason, different mobile loudspeakers are offered, which are to allow good music playback. Important requirements with respect to these mobile loudspeakers are for example a low weight and a low volume due to the desired transportability, independent current supply as long as possible and of course good sound quality in music playback at the same time.

The object of the present invention is in providing a mobile loudspeaker with improved sound quality, which is easily and conveniently to be transported at the same time.

SUMMARY

This object is solved by the present invention according to claim 1 or claim 11. Advantageous developments of this invention are apparent from the dependent claims.

The present invention provides a loudspeaker apparatus for generating sound with an electromechanical transducer for converting electrical signals into mechanical oscillations and a membrane, which is coupled to the electromechanical transducer. The electromechanical transducer can for example comprise a vibration device, which is configured such that vibrations can be induced by electrical signals in controllable manner. In this context, the employment of piezomechanical elements would also be conceivable, which convert electrical signals into mechanical movements or oscillations.

Since the membrane is coupled to the electromechanical transducer, it is excited and outputs audible sound in this manner. The invention is characterized in that the membrane is bistably configured to assume either a stable operating state or a stable transport state. States other than the two states of the membrane are instable. A spatial extension of the bistable membrane is smaller in the transport state than in the operating state in one dimension. Since the membrane can be transferred into a transport state, which is smaller than the operating state, it is for example more easily possible to transport the loudspeaker apparatus at a trip, for example in a park. Thus, the membrane can assume two stable states. One state is used for the mobile sound playback, the so-called operating state, the other state is adapted to easy transportability, the so-called transport state.

A development of the present invention provides a loudspeaker apparatus, wherein the bistable membrane is rolled up in the transport state. In the rolled-up state, the membrane is substantially more compact and requires considerably lower volume and thus less space requirement. This complies with the desire of good transportability.

In a special embodiment of the present invention, the bistable membrane partially or completely encompasses a cylindrical housing of the loudspeaker apparatus in the transport state. In this case, the loudspeaker apparatus includes the membrane as well as the cylindrical housing. Since the membrane can be rolled up around the cylindrical housing, it forms one unit with this cylindrical housing. Thereby, all of the components of the loudspeaker apparatus are compactly combined, can be very easily transported and the risk of losing the bistable membrane is thus reduced.

In a further example of the present invention, the bistable membrane is manufactured of spring steel. Spring steel is a steel, which has higher strength compared to other steels. Elasticity as a prominent characteristic of the spring steel is achieved by producing an alloy with the corresponding characteristics. That is, there are various variants for spring steel, which are based on different alloys. The shaping of the membrane is also of importance. Mostly, the bistable membrane obtains an arcuate cross-section by rolling. Thereby, the force or the expenditure of force can be influenced, by which the membrane can be transferred from the stable operating state into the stable transport state. However, the bistable membrane does not have to be necessarily curved. It is also possible that the bistable membrane is configured in non-curved shapes, for example in cuboid-like structures or flat.

Especially, the bistable membrane can be formed such that it autonomously rolls up from the stable operating state into the stable transport state by kinking. By kinking, the arcuate cross-section of the membrane in the stable operating state is for example transferred into a straight cross-section at the kink. Thereby, that potential energy is applied, which is required to overcome the potential hill, which is between the stable operating state and the stable transport state. Since the bistable membrane only has a single further stable state, namely the transport state, besides the stable operating state (without external influence), all of the states therebetween are instable. As a result, the membrane for example rolls up into the transport state in completely reproducible manner if the arcuate cross-section of the membrane is sufficiently disrupted at one location (compare potential hill). Only by a fixedly preset expenditure of force, the membrane can be again unrolled from the transport state such that it assumes the usually linear, stable operating state, in which it locks (compare "snap band" below).

A further embodiment of the present invention provides that the bistable membrane is attached to the cylindrical housing with the aid of a permanent magnet. Therein, the permanent magnet can be arranged on the outer or inner side of the cylindrical housing. Thereby, it is possible to simply attach the membrane to the cylindrical housing and also to simply detach it again. If the permanent magnet is arranged on the inner side of the cylindrical housing, thus, it is not externally visible. This can become necessary in particular if the permanent magnet would disturb for reasons of design.

A further attaching variant provides that the bistable membrane is coupled to the electromechanical transducer by a detachable mechanical connection. Such a detachable mechanical connection can for example be a plug connection. A Velcro fastener as a detachable mechanical connection is also conceivable. Therein, clamping connections can also be employed. According to configuration of the loudspeaker apparatus within the cylindrical housing, it can be advantageous if the attachment is not magnetic. In the variant with the permanent magnet, magnetic interference fields could occur, which could possibly impair the electronics or the electromechanical transducer of the loudspeaker apparatus. In such a case, a detachable mechanical connection allows coupling the membrane to the electromechanical transducer without therein influencing the possibly sensitive electronics in the interior of the cylindrical housing.

Furthermore, it is provided in an additional configuration of the present invention that the electromechanical transducer is positioned perpendicular to the bistable membrane. If the electromechanical transducer is perpendicular to the membrane, thus, the transfer of mechanical oscillations or mechanical vibrations from the electromechanical transducer to the membrane is particularly effective. In addition, this positioning allows symmetric construction of the loudspeaker apparatus. This can be advantageous in particular if the loudspeaker apparatus is to be visually particularly attractively conceived.

If the membrane is also to be used for viewing images besides the generation of sound, thus, a further configuration of the present invention provides that the loudspeaker apparatus comprises a projector, by which light is projectable to the bistable membrane. The projector belongs to the loudspeaker apparatus in this variant of the invention. It is formed to emit light and to light the membrane. In other words, the projector can project light to the membrane. Thereby, the membrane can be used as a passive projection surface, thus like a type of cinema screen. For example, the projector can be configured as a beamer, as it is often found in lecture halls. Further, this beamer can also be configured correspondingly small and mobile like the loudspeaker apparatus.

In a further embodiment of the present invention, it is provided that the loudspeaker apparatus comprises a display for presenting images and/or videos (e.g. foil display, e-paper). In this case, an external projector is not required. The images and videos, respectively, can be loaded from an internal memory of the loudspeaker apparatus or be obtained via a mobile data link to the Internet in this case. In this case, the loudspeaker apparatus comprises a transceiver device to a mobile data network like a smart phone.

For generating the mechanical oscillations or vibrations, it can be provided in a further embodiment of the present invention that the electromechanical transducer is configured as a piezoelectric actuator. A piezoelectric stack, which can include layered piezoelectric stack elements, is for example the principal item of a piezoelectric actuator. If a voltage is applied to the piezoelectric stack, thus, at least one spatial dimension of the piezoelectric stack changes. Thereby, electrical signals can be transformed into mechanical oscillations. This embodiment is advantageous in particular if the mechanical oscillations are not to be generated on magnetic principle. A mechanical oscillation can be directly generated from an electrical signal.

The present invention also provides a method for operating a loudspeaker apparatus for generating sound. By means of an electromechanical transducer, mechanical oscillations are generated by electrical signals. Therein, the electromechanical transducer can be configured as a piezoelectric actuator as is explained in the previous paragraph. The electromechanical transducer is coupled to a bistable membrane, which has a stable operating state or a stable transport state. Therein, the bistable membrane is transferred from the transport state into the operating state, which is larger than the transport state in one spatial dimension, for coupling to the electromechanical transducer. The transfer from the transport state into the operating state is for example effected by unrolling the bistable membrane. If one wishes to compactly stow the bistable membrane or connect it to the housing after switching off the loudspeaker apparatus, thus, the bistable membrane can be rolled up into the transport state in an optional step and be decoupled from the electromechanical transducer. Thereby, the loudspeaker apparatus can be changed into a transportable state. Further, the same advantages and possibilities of variation explained in connection with the described loudspeaker apparatus apply.

BRIEF DESCRIPTION OF THE DRAWINGS

Now, the present invention is explained in more detail based on the attached drawings, in which there show.

DESCRIPTION OF THE PREFERRED EMBODIMENTS

The embodiments now mentioned in the following represent particularly advantageous configurations of the present invention. They describe further advantages, features and details of the invention, but are also conceivable in other embodiments or feature combinations without departing from the scope of the invention.

Figure 1:
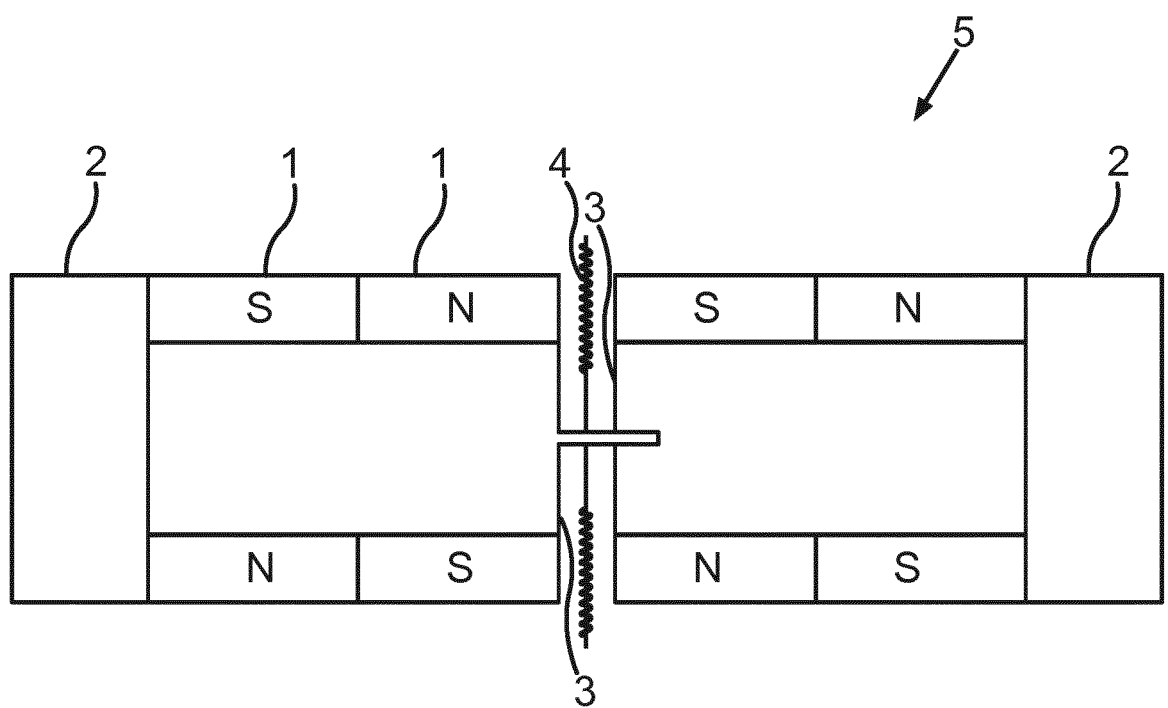
FIG. 1 a schematic side view of a half drive (quad-magnet system) of the electromechanical transducer with a fixing device.

FIG. 1 sketchily shows a drive of an electromechanical transducer 7 of a loudspeaker apparatus 17 in a side view. This drive comprises four permanent magnets 1, therefore, this drive is also referred to as quad-magnet system 5. A coil 4 with windings is centrally slightly indicated. An electromechanical transducer 7 comprises two quad-magnet systems 5 as illustrated in FIG. 1. The quad-magnet system 5 involves four permanent magnets 1 in contrast to the Marquis' approach, which employs two magnets per drive. By the employment of four permanent magnets 1, the employment of pole shoes is omitted, which are considered disadvantageous due to the transitional loss from iron to magnet.

In order to generate mechanical oscillations, the coil 4 is oscillated by electrical signals. Since the coil 4 is arranged in a magnet system, which comprises two quad-magnet systems 5, a change of the current intensity induces a mechanical movement of the coil 4 due to the induction principle. One can also regard the combination of two quad-magnet systems 5 as a "sandwich magnet system". The coil 4 is exemplarily shown in a diagram in FIG. 2 together with the quad-magnet system 5. In this case, the coil 4 is imprinted on a board. The coil support can for example be paper impregnated with Pertinax or epoxy resin. In this example, the coil 4 is formed of red copper tracks, which represent the windings. Recesses in the board material provide for weight reduction. For example, they are arranged along the central axis of the board. However, only one recess is visible in FIG. 2.

Figure 2:
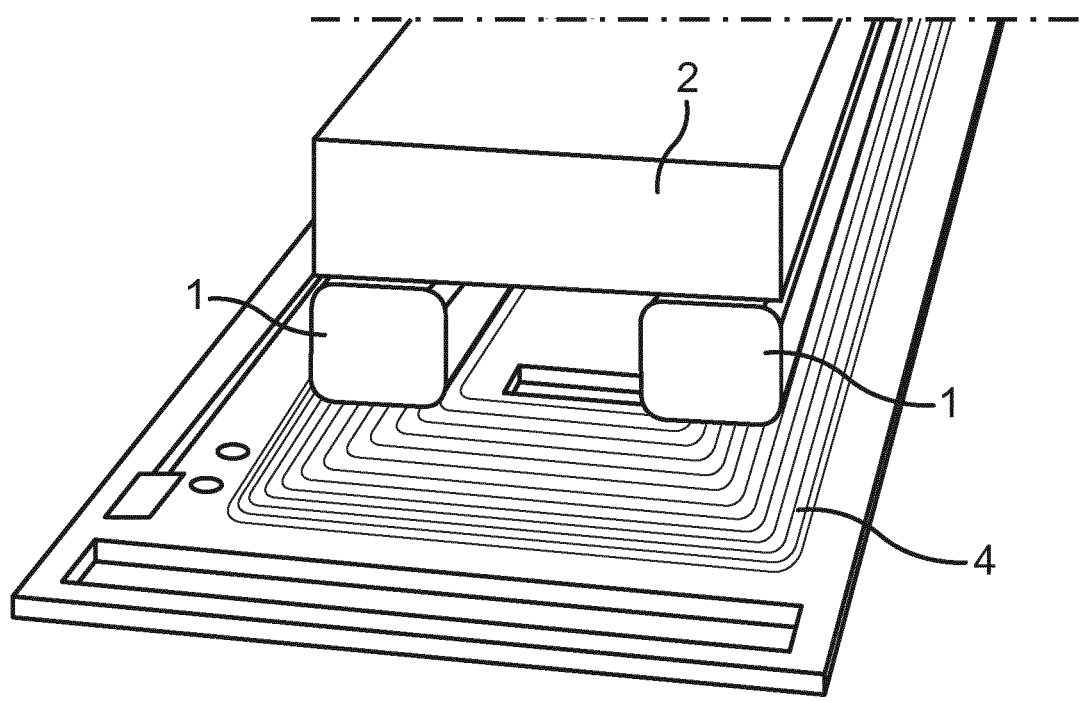
FIG. 2 a quad-magnet system on a board with imprinted coil.

Pure iron 2 is provided in FIG. 2 as the support element for the quad-magnet system 5. The support element could also comprise plastic, but pure iron 2 offers the advantage of amplifying the magnetic flux and thus improving the effect of the magnet system. In order to additionally amplify the magnetic flux, it can be provided that the pure iron 2 is additionally lapped or polished on the surfaces, with which it contacts the permanent magnets 1, in a "high-end variant". In using pure iron 2 as the support element of the quad-magnet system 5, the permanent magnets 1 do not have to be adhered to the support element, because the force of the permanent magnets 1 is as great as they adhere to the pure iron 2 by themselves. According to configuration of the loudspeaker apparatus 17, different permanent magnets 1 can be employed. The employment of N42 to N50 magnets is usual because the magnetic force thereof is large enough such that they readily stick to the pure iron 2.

Figure 3:
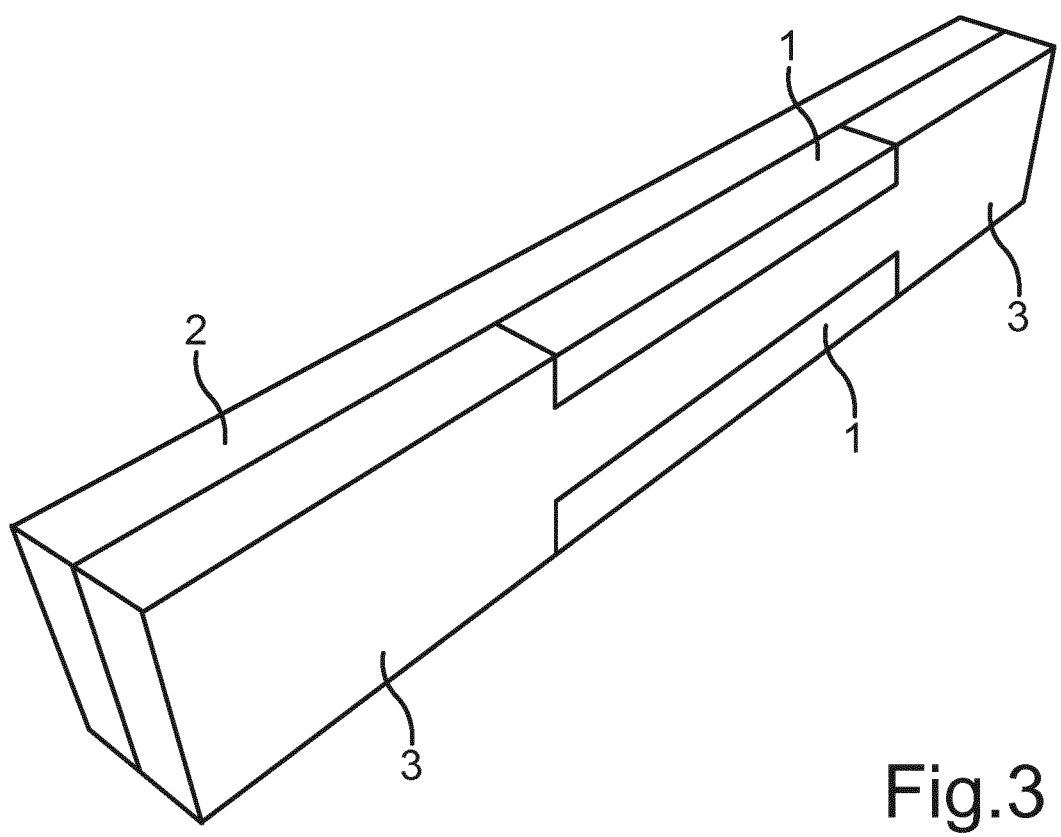
FIG. 3 a diagram of a quad-magnet system with fixing device.

However, the permanent magnets 1 shown in FIG. 2 attract each other such that they would approach each other in shortest time and enter into contact. In other words, the system shown in FIG. 2 is not stable with vibrations. With vibrations, the permanent magnets 1 would not remain at their places, but fast converge and enter into contact. Therefore, it is required to provide a fixing, which prevents the permanent magnets 1 from leaving their position even with vibrations. FIG. 3 exemplarily shows the quad-magnet system 5 with a fixing device 3. The fixing device 3 rests on the pure iron 2 and provides recesses for the permanent magnets 1. In these recesses, the permanent magnets 1 find place and are thus fixed. Further, the fixing device 3 can be formed to retain the coil 4 within the sandwich magnet system and to define and ensure the distance of both quad-magnet systems 5.

The fixing device 3 serves as a spacer element and can be manufactured of aluminum or plastic. Other metallic or ceramic materials are also possible as the spacer element. The fixing device 3 is capable of maintaining the upper and lower permanent magnets 1 at correct distance and can comprise additional bores and threads, which allow attaching the sandwich magnet system for example in a frame or the like. A fastening device to fix the coil within the quad-magnet systems 5 can also be arranged at the fixing device 3. Thus, the width of the gap of the two quad-magnet systems 5 to each other can be adjusted by the fixing device 3. If the pure iron 2 extends across both permanent magnets 1, as is shown in FIG. 2 and FIG. 3, thus, a lower set-up height of the loudspeaker apparatus 17 can thereby be achieved. This can be of importance for extremely flat loudspeakers. However, the width of the loudspeaker apparatus 17 increases in this case. For example, the fixing device 3 can be obtained by milling.

Figure 4:
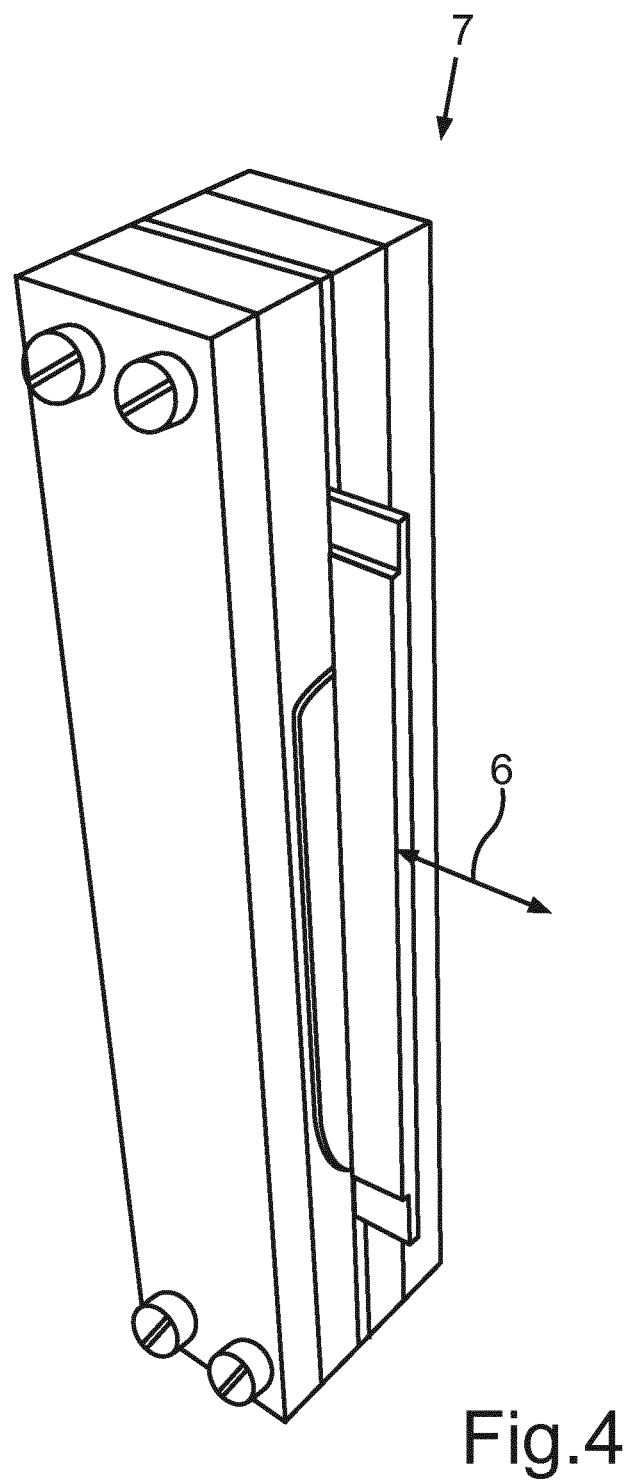
FIG. 4 a diagram of the electromechanical transducer in vertical position.

If two quad-magnet systems 5, as shown in the diagram in FIG. 3, are mounted together, thus, the electromechanical transducer 7 arises. This electromechanical transducer 7 is seen as a diagram of a prototype in vertical position in FIG. 4. The two quad-magnet systems 5 can for example be fixed to each other by M3 threaded screws as is shown in FIG. 4. In addition, shims or washers can be used to adjust the air gap between the two quad-magnet systems 5. These threaded screws can further be used to later fix the electromechanical transducer 7 to a cylindrical housing 8 of the loudspeaker apparatus 17. The board with the imprinted coil is inserted in the gap between the two quad-magnet systems 5 such that it can reciprocate within the magnetic field. The drawn double arrow indicates directions of movement 6 of the board coil if it is flown by an alternating current. The amplitude of the directions of movement 6 is about 4 to 5 millimeters in this embodiment. These mechanical oscillations or vibrations are transferred to a bistable membrane 18 in the further course.

Figure 5:
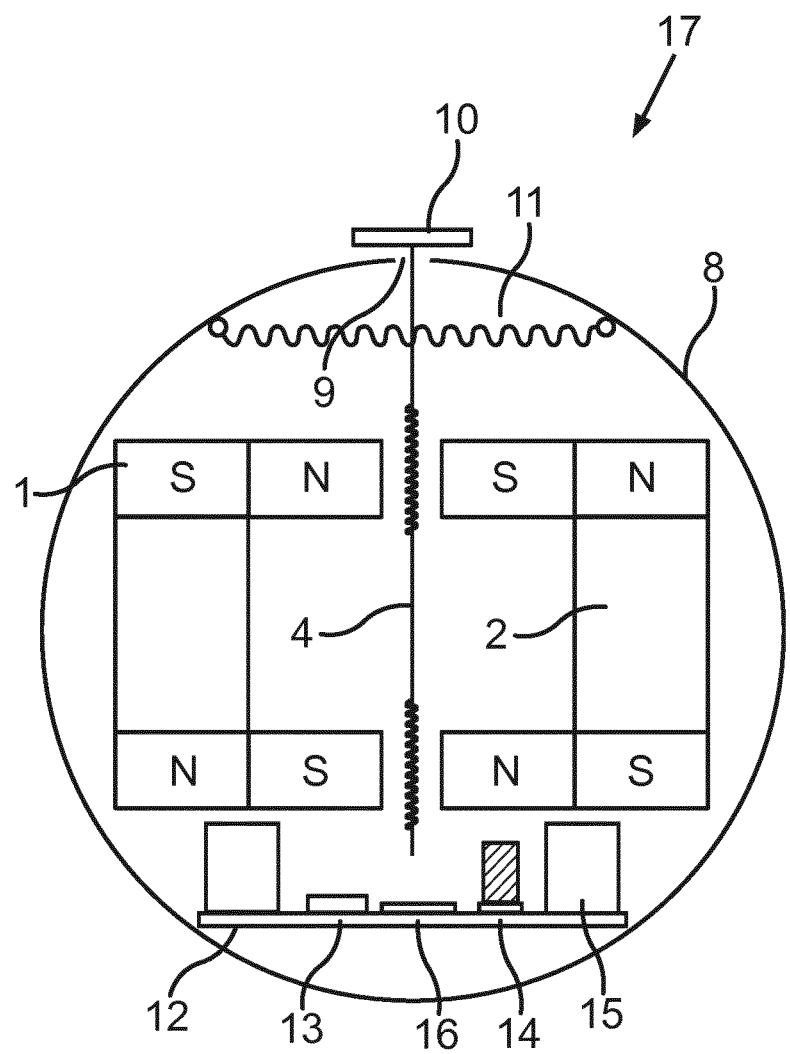
FIG. 5 a schematic diagram of the electromechanical transducer in a cylindrical housing in a plan view including further electronic components.

The electromechanical transducer 7 can be arranged within the cylindrical housing 8 of the loudspeaker apparatus 17 as FIG. 5 exemplarily shows. FIG. 5 shows a schematic plan view to the loudspeaker apparatus 17, wherein the interior space of the loudspeaker apparatus 17 is exemplarily sketched. Therein, the board coil is conceived such that it protrudes from the quad-magnet system 5 and reaches the outer side of the housing 8 through an opening 9 on the housing 8. There is a fastening element 10 for the bistable membrane 18. In this embodiment, the fastening element 10 is a permanent magnet 1.

In order that the coil 4 does not shake in the air gap of the two quad-magnet systems 5 or even falls out of the air gap, a further fastening device can be attached such that the coil 4 can perform its movements at least partially unimpeded. For example, a centering spider 11 can represent this fastening device. In the example of FIG. 5, further electronic components are disposed within the loudspeaker apparatus 17 bounded by the housing 8. Thus, an amplifier board 12 with an integrated amplifier module 13, a radio antenna 14, an energy buffer 15 as well as a radio and/or charging device 16 is found in this example. The radio device 16 can for example be used to realize a mobile Bluetooth loudspeaker.

Figure 6:
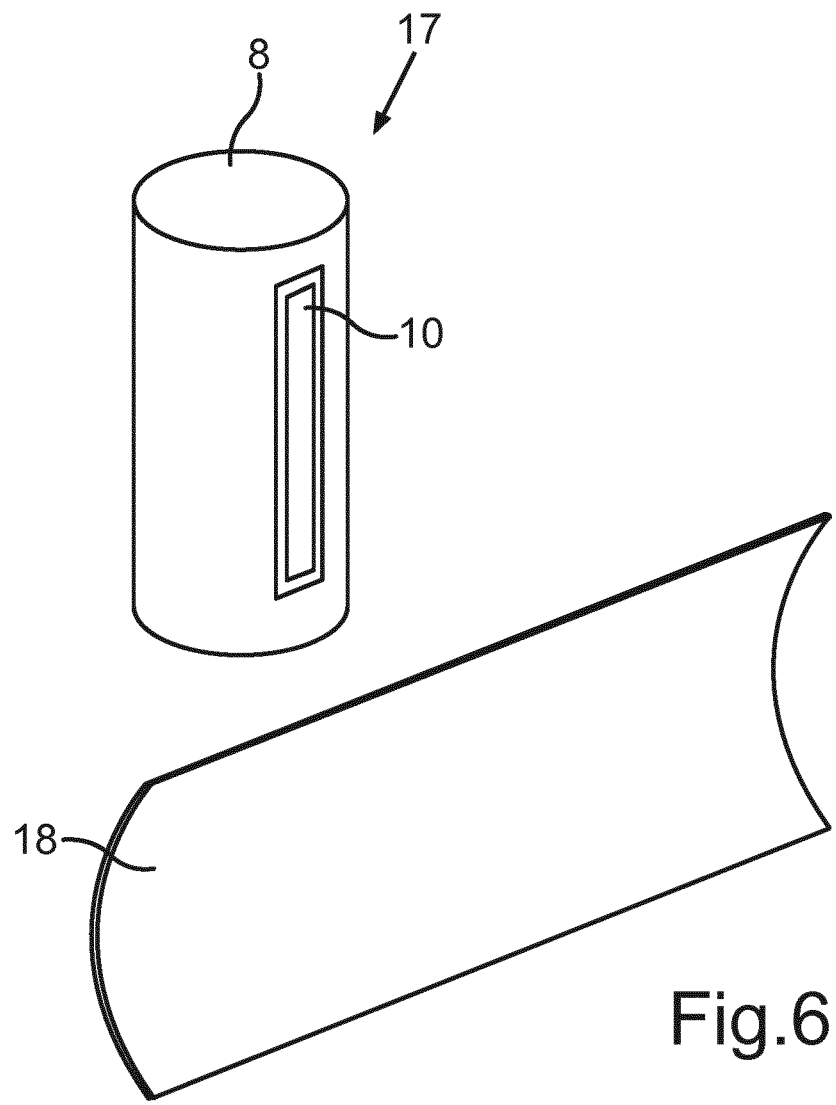
FIG. 6 a schematic diagram of the loudspeaker apparatus with detachable membrane.

FIG. 6 schematically shows the loudspeaker apparatus 17 including the unrolled bistable membrane 18 in the stretched state. This bistable membrane 18 can for example be manufactured of spring steel and can be transferred from one stable state into the second stable state with relatively low expenditure of force for example by kinking, in which the convex or outwards curved sections are moved towards each other. FIG. 6 shows the bistable membrane 18 in its operating state. If the loudspeaker apparatus 17 is to be activated for exemplary music playback, the bistable membrane 18 can be coupled to the loudspeaker apparatus 17 via the fastening element 10. Thereby, the mechanical oscillations generated by the electromechanical transducer 7 can be transferred to the bistable membrane 18. Thereby, the bistable membrane 18 is excited and oscillates the surrounding air, which can be taken as music by humans with correspondingly healthy hearing.

This construction additionally allows fast terminating music playback. In this case, the bistable membrane 18 is simply removed from the loudspeaker apparatus 17. Therein, mechanical oscillations can no longer be transferred to the membrane 18, whereby the surrounding air can no longer be excited by the bistable membrane 18. Thereby, the music becomes silent.

Furthermore, it can be provided that the bistable membrane 18 is configured as a projection surface or as a display. If the bistable membrane 18 is configured as a projection surface, thus, an external projector allows projection of light to the bistable membrane 18 in the operating state. Thus, it is for example possible to display images and animations, respectively, on the bistable membrane 18 by means of a mobile portable beamer. This can for example be applied at a party, at which YouTube videos are presented via a beamer.

Furthermore, it is also possible that the bistable membrane 18 itself represents a display. Thus, the bistable membrane 18 can for example be configured as or with an OLED foil or an electronic paper. These technologies allow configuring the bistable membrane 18 sufficiently thin as a display. In addition, it is possible to receive images and videos, respectively, from a mobile data network or local WLAN network via the radio antenna 14 to display them on the bistable membrane 18.

In this case, the bistable membrane 18 would function as a type of mobile television together with the loudspeaker apparatus 17. In this embodiment, an additional external projector is not required. Besides receiving the images and videos, respectively, from a WLAN link or a mobile data network, it can also be provided that images and videos, respectively, are already stored in an internal memory of the loudspeaker apparatus 17. Thereby, images and videos, respectively, can also be displayed and played back, respectively, without a data link to a mobile data network or WLAN network.

Figure 7:
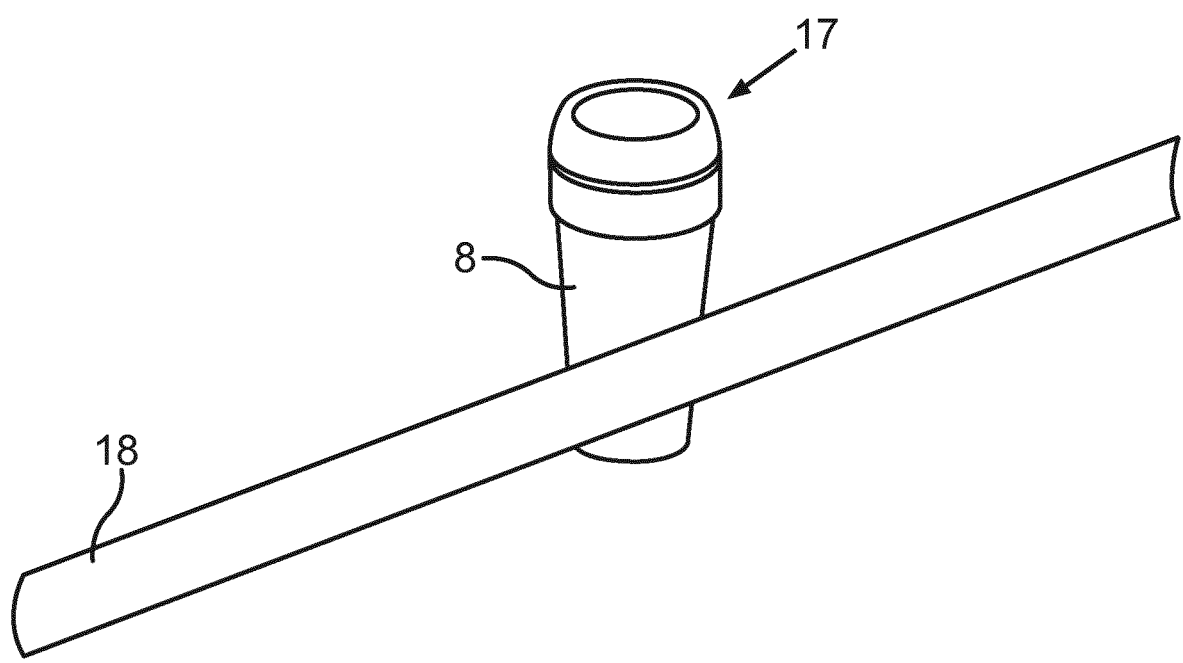
FIG. 7 a diagram of an exemplary loudspeaker apparatus with unrolled membrane, which is coupled to the electromechanical transducer.

FIG. 7 exemplarily shows a diagram of the loudspeaker apparatus 17 as a prototype with the coupled bistable membrane 18 unrolled in the operating state. The bistable membrane 18 is magnetically coupled to the housing 8 of the loudspeaker apparatus 17 in this example. In this prototype, the bistable membrane 18 is configured as a snap band, as it is employed with cyclists. Cyclists use snap bands to prevent their trousers from contacting a bicycle chain.

However, in the present invention, the bistable membrane 18 serves as a module for the playback of sound. The rollable bistable membrane 18 can be produced in various sizes. The bistable membrane 18 shown in FIG. 7 has a width of about 2 centimeters and can therefore provide only a relatively low volume. As far as it is known to the inventor, a bistable membrane 18 with a width of up to 25 centimeters and a length of up to 50 centimeters, optionally also larger, can be produced. This allows producing considerably louder sound than with a membrane having only a width of 2 centimeters. The bistable membrane 18 can be easily removed from the housing 8 due to the magnetic coupling.

Figure 8:
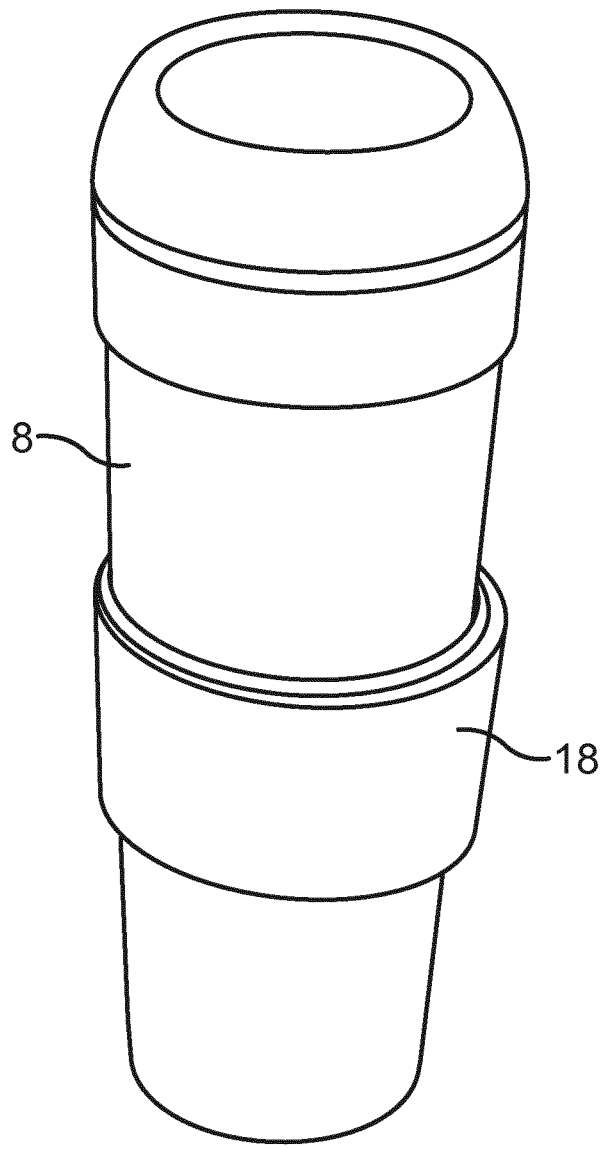
FIG. 8 a diagram of a loudspeaker apparatus, wherein the bistable membrane is rolled up around the cylindrical housing.

Moreover, by a slight pressure on both ends of the bistable membrane 18, it can be caused to roll up. Thereby, the bistable membrane 18 is changed from the operating state as shown in FIG. 7 into the stable transport state as is shown in FIG. 8. If the bistable membrane 18 is caused to roll up by slight pressure on both ends, the bistable membrane 18 relatively fast rolls up by the spring steel characteristic. This characteristic is also found in the name "snap band".

If the bistable membrane 18 is caused to roll up, thus, it is possible that it is passed around the cylindrical housing 8 of the loudspeaker apparatus 17. Therein, a winding of the bistable membrane 18 around the cylindrical housing 8 arises.

FIG. 8 shows a diagram of the loudspeaker apparatus 17 with the bistable membrane 18 in the transport state.

There is also the possibility of non-detachably attach the bistable membrane 18 to the housing 8 or the fastening element 10 such that a spatial separation of bistable membrane 18 and loudspeaker apparatus 17 is not possible anymore. Herein, the coil 4 and the membrane 18 are firmly bonded to each other. In order to get into the operating state, the bistable membrane 18 has to be stretched. For transporting, it is set into the transport state by rolling up the bistable membrane by pressure on both ends. An advantage of this firmly bonded connection is that one cannot lose the bistable membrane 18. However, it is disadvantageous that the bistable membrane 18 is not exchangeable.

The loudspeaker apparatus 17 can be reasonably expanded by the bistable membrane 18. Thereby, music can be played back in better sound quality. Since the membrane 18 is bistably configured, it is additionally possible to set the bistable membrane 18 into a practical transport state. The result is a loudspeaker apparatus 17, which offers a good sound quality and can be easily transported, thus is very mobile, at the same time.

The printed matter DE 10 2008 047 796 A1 discloses the use of a foil as a membrane for a flat-surface loudspeaker. However, this prior printed matter involves multiple deficiencies, which are overcome by the present invention. The foils of the prior disclosure are either very stiff and then not windable or they are windable, but then not stiff enough to be able to serve as a membrane. This printed matter describes a frame for stabilizing the foil. In the employment as a mobile loudspeaker, however, a rigid frame is rather unsuitable.

The present invention offers a bistable membrane 18, which is stable enough on the one hand, yet also flexible enough on the other hand to provide an operating state and a transport state. In addition, an oscillation exciter is attached to the foil in the prior printed matter DE 10 2008 047 796 A1 to realize the loudspeaker. However, thereby, the foil is no longer completely windable because the oscillation exciter either cannot be configured bendable as described. These cited disadvantages of the prior printed matter can be overcome by the features of the present invention and result in a very practically applicable mobile loudspeaker.

Overall, the examples show how the balancing act between good sound quality and good transportability in mobile loudspeakers is solved by the invention. A relatively large surface can be provided as a loudspeaker by the bistable membrane 18, but which can be easily set into a transport state after use. In addition, the bistable membrane 18 can form a practical unit with the loudspeaker apparatus 17 in the transport state.

The invention claimed is:

1. A loudspeaker apparatus for generating sound comprising:
an electromechanical transducer for converting electrical signals into mechanical oscillations,
a bistable membrane coupled to the electromechanical transducer,
wherein:
the membrane is bistably configured to assume one of two stable equilibrium states, other states being unstable, the two equilibrium states being a stable operating state and a stable transport state,
the bistable membrane is configured to vibrate and emit sound in the stable operating state, and
a spatial extension of the bistable membrane is smaller in the transport state than in the operating state in one dimension.

2. The loudspeaker apparatus according to claim 1, wherein the bistable membrane is rolled up in the transport state.

3. The loudspeaker apparatus according to claim 1, wherein the bistable membrane partially or completely encompasses a cylindrical housing of the loudspeaker apparatus in the transport state.

4. The loudspeaker apparatus according to claim 1, wherein the bistable membrane is manufactured of spring steel.

5. The loudspeaker apparatus according to claim 1, wherein the bistable membrane is formed such that it autonomously rolls up from the stable operating state into the stable transport state by kinking.

6. A loudspeaker apparatus for generating sound comprising:
an electromechanical transducer for converting electrical signals into mechanical oscillations,
a bistable membrane coupled to the electromechanical transducer,
wherein
the membrane is bistably configured to assume either a stable operating state or a stable transport state, and
a spatial extension of the bistable membrane is smaller in the transport state than in the operating state in one dimension;
wherein the bistable membrane partially or completely encompasses a cylindrical housing of the loudspeaker apparatus in the transport state;
wherein the bistable membrane is attached to the cylindrical housing with the aid of a permanent magnet.

7. The loudspeaker apparatus according to claim 1, wherein the bistable membrane is coupled to the electromechanical transducer by a detachable mechanical connection.

8. The loudspeaker apparatus according to claim 1, wherein the electromechanical transducer is positioned perpendicular to the bistable membrane.

9. The loudspeaker apparatus according to claim 1, wherein the loudspeaker apparatus comprises a projector, by which light is projectable to the bistable membrane.

10. The loudspeaker apparatus according to claim 1, wherein the bistable membrane of the loudspeaker apparatus comprises a display for presenting images and/or videos.

11. A method for operating a loudspeaker apparatus for generating sound comprising the following steps:
generating mechanical oscillations by electrical signals with the aid of an electromechanical transducer,
coupling the electromechanical transducer to a bistable membrane configured to assume one of two stable equilibrium states, other states being unstable, the two equilibrium states being a stable operating state and a stable transport state,
wherein the bistable membrane is transferred from the transport state into the operating state for coupling to the electromechanical transducer,
wherein the bistable membrane is configured to vibrate and emit sound in the stable operating state, and
wherein the bistable membrane is larger in the operating state than in the transport state in one spatial dimension.

12. The loudspeaker apparatus according to claim 1, wherein the membrane is formed of a material that enables the bistable configuration of the membrane, the material of the membrane enabling assumption of the two stable equilibrium states.

13. The loudspeaker apparatus according to claim 1, wherein the membrane does not comprise one or more bistable support members to enable the membrane to assume one or both of the two stable equilibrium states.

* * * * *